United States Patent [19]
Hansen

[11] 3,855,875
[45] Dec. 24, 1974

[54] CLUTCH PEDAL OPERATED DOWN SHIFTING MECHANISM

[75] Inventor: Kenneth N. Hansen, Waukesha, Wis.

[73] Assignee: Allis Chalmers, Milwaukee, Wis.

[22] Filed: Dec. 20, 1972

[21] Appl. No.: 316,998

[52] U.S. Cl. .................................. 74/481, 192/3.57
[51] Int. Cl. ....................... G05g 11/00, F16d 67/02
[58] Field of Search ............. 192/3.57, 4 A; 74/481, 74/474

[56] References Cited
UNITED STATES PATENTS

| | | | |
|---|---|---|---|
| 2,872,000 | 2/1959 | Herndon et al. | 192/4 A |
| 3,505,896 | 4/1970 | Phillips | 74/481 |
| 3,537,328 | 11/1970 | Allen | 74/474 |
| 3,687,248 | 8/1972 | Holub | 192/3.57 |
| 3,741,356 | 6/1973 | Sieren et al. | 74/474 |

FOREIGN PATENTS OR APPLICATIONS

| | | | |
|---|---|---|---|
| 1,358,300 | 3/1964 | France | 74/481 |

Primary Examiner—Samuel Scott
Assistant Examiner—Allan R. Burke
Attorney, Agent, or Firm—Arthur L. Nelson

[57] ABSTRACT

A mechanism for shifting down the transmission speed range when the clutch pedal is moved to a throttling position.

10 Claims, 3 Drawing Figures

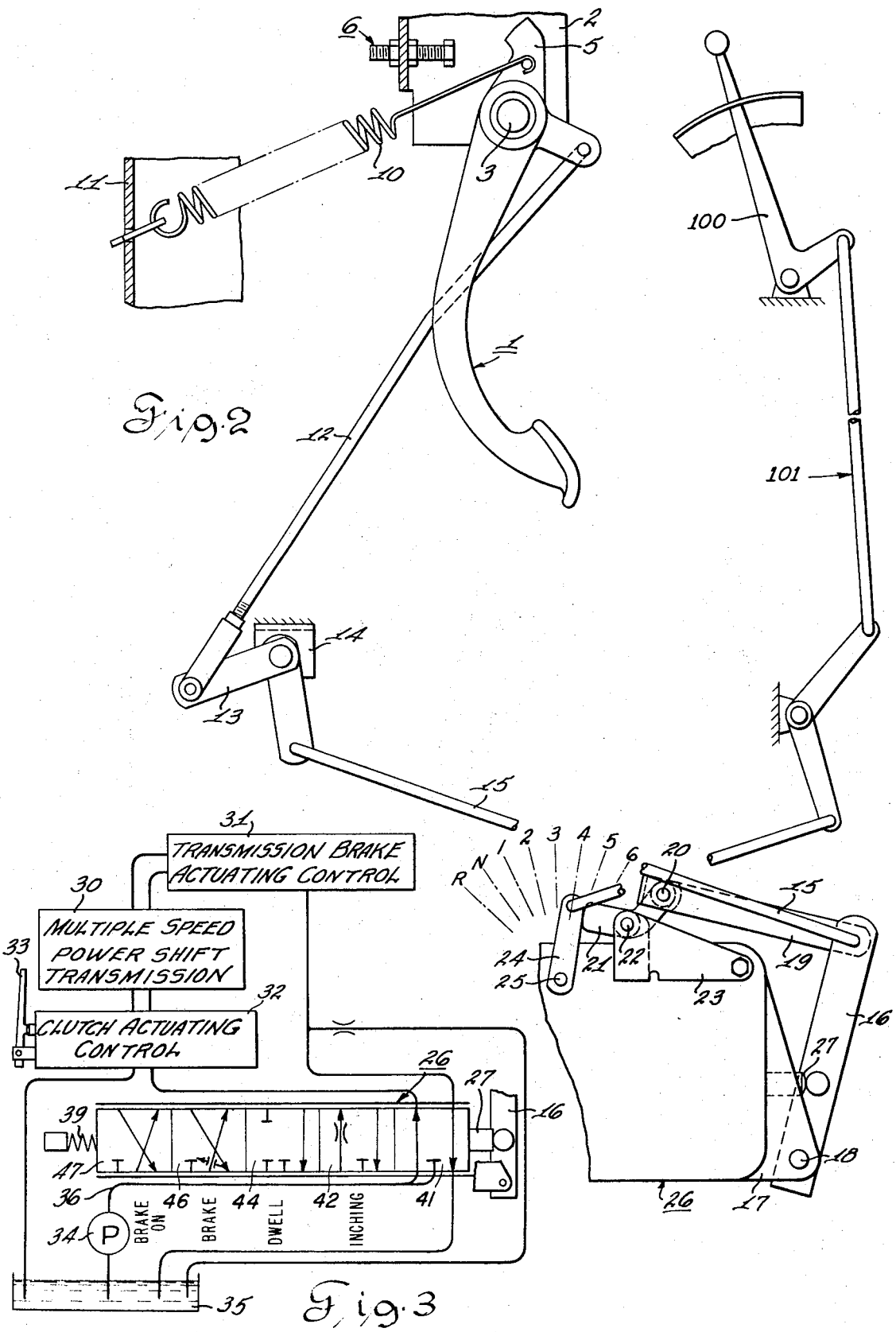

CLUTCH PEDAL OPERATED DOWN SHIFTING MECHANISM

This invention relates to shifting of a vehicle transmission and more particularly to a mechanism for shifting the vehicle transmission to a lower speed range when the clutch pedal is positioned to throttle the pressurized fluid in the hydraulic clutch control valve which operates the vehicle clutch.

The power shift transmission is used on many of the modern tractors today. The power shift transmission uses hydraulic actuators to engage one or more clutches in the gear train. Conventionally, planetary gearsets are used in power shift transmissions in which one or more of the rotating components which consist of the sun gear, ring gear, or the planetary carrier are clutched. By clutching or braking one or more of the components the power path through the transmission is varied and likewise the speed ratios and torque ratios of the transmissions are also varied. The shifting of the power shift transmission may be accomplished in various ways. One means is to use an actuator which operates a plurality of cams to selectively engage one or more of the clutches in the sequence to provide the desired speed ratios for the power train. This type of an actuator may employ a lever to selectively move the camming means to select the speed range and torque ratio as desired.

Although the clutches requiring transmission of high torque generally include a plurality of clutch discs in order to transmit the torque, higher speed ratio torque transmitting clutches may use fewer clutch discs and deliver power through a lower torque ratio but at a higher speed. The higher speed ratios of a transmission such as these are usually used to serve as a road speed or some transport speed where a lower draft load is required and the main objective is to move the vehicle from one place to another at a fairly rapid rate.

It is understood that tremendously high energies are released to the transmission clutch when the clutch is engaged. Initially in starting the vehicle the clutch may be allowed to slip because of the low pressure in the hydraulic actuator of the clutch which can be controlled by the clutch pedal by throttling of the pressurized fluid in the hydraulic actuating valve. Accordingly, when the vehicle is started from a standstill, this provision for a limited amount of clutch slippage must be built into the clutch. Considering the energy release to which the clutch is subjected, this energy must be absorbed and/or dissipated in order that the clutch will provide the reliability necessary for this type of vehicle. Accordingly as a safety precaution and also as a means for providing greater life for the clutches in the transmission of this type, this invention provides a means whereby the vehicle must be initially started in the lower ranges of the power shift transmission. This is accomplished by a mechanical means which automatically shifts the power shift transmission into the lower speed ranges when the clutch pedal is moved to the throttling position such as initially engaging the clutches or operating the clutch whereby slippage of the clutch is permitted by manual control.

It is an object of this invention to provide a mechanism for shifting the vehicle transmission to one of the lower speed ranges when the clutch pedal throttles hydraulic fluid in the hydraulic clutch control valve permitting limited slippage in the clutch of the power shift transmission.

It is another object of this invention to provide a mechanical linkage connected to the clutch pedal for shifting the transmission shift lever of a power shift transmission out of a high speed range or to prevent the shift lever from shifting into a high speed range when the clutch pedal reduces a fluid actuating pressure for actuating the vehicle clutch.

It is a further object of this invention to prevent excessive slippage of the clutch when the power shift transmission is in the high speed range by the use of a mechanical linkage connected between the clutch lever operating the hydraulic clutch control valve to shift the vehicle transmission into a higher torque and lower speed range.

The objects of this invention are accomplished by providing a power shift transmission operating in the gear train of a tractor type vehicle. A shift lever is mounted on the power shift transmission which selectively shifts the transmission from reverse through a plurality of forward speeds. A control for the shifting of the shift lever of the power shift transmission is a lever operating through a linkage which is connected to the shift lever on the vehicle transmission. The control lever is positioned at the operator station on the vehicle.

Also connected to the transmission is a vehicle clutch and brake pedal which has a return spring to normally return the pedal to its return position. When the pedal is in its return position the vehicle clutch for the transmission is engaged. Engagement of the clutch is provided for through operation of the pedal which operates through a linkage connected to the hydraulic control valve. The hydraulic valve is spring biased to a normal clutch engaging position in which pressurized fluid from the pump is allowed to pass through the valve and into the hydraulic actuator for actuating the clutch. As the clutch pedal is depressed the hydraulic fluid passing through the hydraulic valve is throttled and the pressure is reduced in the hydraulic actuator actuating the clutch; this in turn will permit a limited amount of slippage, the degree of which depends upon the amount of movement of the clutch pedal in releasing the clutch. The throttling condition is permissible in a clutch of the vehicle transmission so long as the transmission is in one of the high torque ranges. Accordingly, a cam means is connected to the clutch actuating linkage and this cam normally biases the power shift lever to one of the high torque gear ranges to prevent throttling in the high speed ranges. This mechanism operates automatically when the clutch pedal is depressed.

The pedal also operates as a brake pedal and in its completely depressed position it actuates a transmission brake to brake the rotating components of the transmission.

Referring to the drawings the preferred embodiment of this invention is illustrated:

FIG. 2 illustrates the clutch and brake control mechanism and the power shift linkage with a camming arrangement down shifting the shift lever to one of the high torque ranges.

FIG. 3 is a schematic illustration of the hydraulic clutch and brake actuating system on the vehicle.

Figure 1:
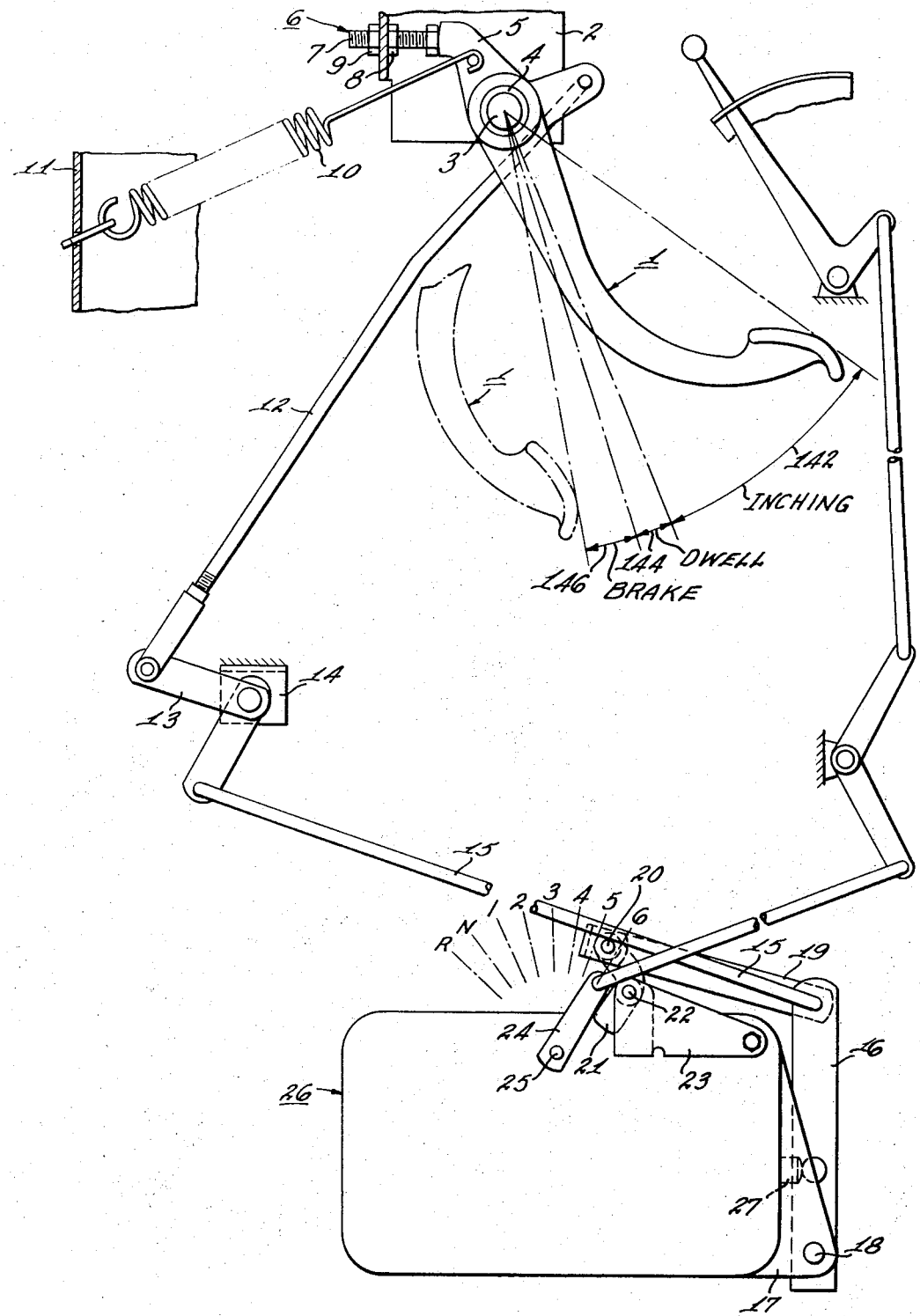
FIG. 1 illustrates the clutch and brake control mechanism and the shift lever on the power shift transmission.

Referring to FIG. 1, the pedal 1 is mounted on the bracket 2 by means of the pivotally supported pivot pin 3 embraced by the bushing 4. The pedal 1 forms an arm 5 which abuts against the stop 6 which includes the bolt 7 fastened to the bracket 2 by the nuts 8 and 9. The pedal 1 operates as a clutch pedal and a transmission brake pedal and swings through the phases as indicated by the angular segments designated inching, dwell, and brake. The arm 5 of pedal 1 is connected to a return spring 10 which is fastened to the bracket 11 to normally return the pedal to its retracted position as indicated.

A pedal 1 is connected through the adjustable link 12 to the bellcrank 13 which is pivotally supported on the chassis 14. The bellcrank 13 operates pushrod 15 which is pivotally connected to the actuator arm 16 which is pivotally supported on the bracket 17 by means of the pin 18. At the point the actuator arm 16 is connected to the pushrod 15 the link 19 is also connected. The link 19 is connected by means of the pivot 20 to the cam 21 which is pivotally supported on the pin 22 of bracket 23. Pivotal movement of the actuator arm 16 causes the cam 21 to pivot about its supporting pin 22 which moves the shift lever 24. A manual control lever 100 operates shift lever 24 through linkage 101. The shift lever 24 is pivoted on the pin 25 of the hydraulic transmission control valve 26. The hydraulic transmission control valve includes a valve arrangement for selectively operating valves to engage one of the plurality of hydraulic clutches in the power shift transmission for the selected power path through the transmission. The hydraulic control valve 26 also includes the spool valve which spool 27 is operated by the actuator arm 16. The operation of the control valve including the spool 27 is shown in FIG. 3.

Referring to FIG. 2 the same mechanism is illustrated, however, the clutch pedal 1 is in a depressed position and the spool 27 is operated. It is noted that the link 19 moves the cam 21 causing the shift lever 24 to shift down to the fourth speed range of the power shift transmission.

Power shift transmissions of the type used in a device as illustrated are shown in the U.S. Pat. Nos. 3,548,680, 3,548,681, 3,548,666, and 3,548,665. These power shift transmissions show various gearing, clutching and braking for the transmission which can be selectively operated by the operator.

Referring to FIG. 3 the illustration of the hydraulic valve for the power shift transmission is shown. A multiple speed power shift transmission 30 is connected to the transmission brake actuating control 31 and the clutch actuating control 32. A shift lever 33 is shown on the end of the clutch actuating control 32 and provides a means similar to that of a function of the shift lever 24 as shown in FIG. 1. The clutch actuating control 32 and the transmission brake actuating control 31 selectively direct pressurized fluid to hydraulic clutch and brake actuators for the desired speed ratio or braking.

The pump 34 receives fluid from the reservoir 35 to pressurize fluid in the conduit 36. The conduit 36 is connected to the control valve 26. The control valve 26 supplies pressurized fluid to the clutch actuating control 32 and the transmission brake actuating control 31. The actuating arm 16 functions as the actuating arm 16 as shown in FIG. 1. The spool 27 of the valve 26 is biased to the right hand position by a spring 39 similar to that of the spool 27 as shown in FIG. 1.

The pedal 1 as shown in FIG. 1 operates through the linkage to control the spool 27 and in a normally retracted position the clutch actuating control 32 is in communication through the section 41 of the valve. As the pedal 1 is depressed the section 42 throttles the hydraulic fluid and the clutch of the transmission can be slipped to provide starting of the vehicle or control the movement of the vehicle at a decreased rate as desired by the operator.

The inch position 142 shows the initial portion movement of the left pedal 1 in which the clutch is initially actuated and then gradually disengaged. The dwell position 144 is illustrated when the intermediate section 44 as shown in the valve 26 is in operation. As the pedal 1 is continued to be depressed the section 46 comes into operation and the brake is initially being operated, and the section 47 of valve 26 fully engages the transmission brake during the brake phase 146.

The operation of the device will be described in the following paragraphs.

When the pedal 1 is depressed the spool 27 of the valve 26 moves inwardly in the housing. The spool 27 of valve 26 shown in FIG. 1 is similar to that shown in FIG. 3. Initially the clutch is engaged when the pedal 1 is in the fully retracted position. As the pedal is depressed the section 42 comes into operation in which pressurized fluid is throttled as it is passed through the valve 26 to the clutch actuating control 32. During this phase of pedal 1 movement, slippage of clutches in the transmission 30 can be tolerated only in the high torque ranges which are considered to be the ranges below range 5 and 6 as shown on the transmission control valve. This is accomplished as the pedal 1 is depressed and the adjustable link 12 moves downwardly to pivot bellcrank 13 as the pushrod 15 operates the actuator arm 16. Movement of this linkage causes the cam 21 to pivot on its support pin 22. The cam then biases the shift lever 24 in a counterclockwise rotation to the position as shown in FIG. 2. In this position the shift lever 24 is rotated counterclockwise to the position 4 which is the fourth speed range of the transmission. This is the speed range which is considered a high torque output and a low speed range.

The shift lever 24 may be shifted into any of the four forward speed ranges if the operator is moving in the forward direction. It is noted that the cam 21 not only biases the shift lever 24 out of the shift ranges 5 and 6 but maintains them out of these positions and permits freedom to shift the shift lever into any of the four low speed high torque ranges.

If the pedal is further depressed it moves through the dwell phase in which the section 44 of valve 26 permits only drain of fluid from the brake actuating control 31. As the pedal is further depressed the sections 46 and 47 of the control valve 26 move into operation and initially the pressurized fluid from the pump 34 is throttled as it passes through the control valve 26 to the transmission brake actuating control. The brake is fully engaged when the section 47 is in position for transmission of pressurized hydraulic fluid from the pump 34 to the transmission brake actuating control 31. It is noted that the control valve 26 includes a spool 27 which is spring biased to the right hand direction when the pedal is operated. The pedal 1 is also fitted with a return spring which returns the pedal to its normal retracted position when the pedal is released.

The embodiments of the invention in which an exclusive property or privilege is claimed are defined as follows:

1. A vehicle clutch and shift mechanism for a vehicle transmission including, a pedal, a hydraulic clutch actuating valve adapted for operating a vehicle clutch, a hydraulic clutch actuating linkage connected between said pedal and said valve for operating said valve with said pedal, a shift control adapted for operating a multiple speed power shift transmission including, a speed range shift lever for shifting the transmission through a plurality of speed ranges, a manual control lever means connected to said speed range shift lever, a cam means connected to said hydraulic clutch actuating linkage and engaging said shift lever to bias said shift lever to the lower speed range positions when said clutch pedal operates said hydraulic valve to throttle hydraulic fluid for limited slippage of the vehicle clutch.

2. A vehicle clutch and shift mechanism for a vehicle transmission as set forth in claim 1 including, a pedal stop adapted for engaging a portion of a pedal in its retracted position, a clutch return spring connected to said pedal for returning said pedal to its normally retracted position against said stop.

3. A vehicle clutch and shift mechanism for a vehicle transmission as set forth in claim 1 wherein said hydraulic clutch actuating valve includes, a valve spool, a spring normally biasing said valve spool against said linkage.

4. A vehicle clutch and shift mechanism for a vehicle transmission as set forth in claim 1 wherein said hydraulic clutch actuating valve includes, means adapted for operating a hydraulic clutch, when said pedal is depressed.

5. A vehicle clutch and shift mechanism for a vehicle transmission as set forth in claim 1 wherein said pedal includes, means normally retracting said pedal to its retracted position, a hydraulic valve adapted for supplying pressurized fluid for engaging a hydraulic clutch when said pedal is in its normally retracted position.

6. A vehicle clutch and shift mechanism for a vehicle transmission as set forth in claim 1 including, a multiple speed power shift transmission, means on said hydraulic clutch actuating valve pivotally supporting said shift lever, means on said hydraulic clutch actuating valve for pivotally supporting said cam means.

7. A vehicle clutch and shift mechanism for a vehicle transmission as set forth in claim 1 wherein said hydraulic clutch actuating valve includes, an actuating arm, a spool in said valve operated by said arm for controlling the operation of the vehicle clutch.

8. A vehicle clutch and shift mechanism for a vehicle transmission as set forth in claim 1 wherein said hydraulic clutch actuating valve includes, a spool, a spool actuating arm, said cam means defines a lever having a cam surface for engaging said shift lever, and a link connecting said actuating arm with said cam means.

9. A vehicle clutch and shift mechanism for a vehicle transmission as set forth in claim 1 wherein said cam means defines a stop to prevent said shift lever from shifting to the high speed range positions when said pedal is operated.

10. A vehicle clutch and shift mechanism for a vehicle transmission as set forth in claim 1 wherein said cam means defines a lever having a cam surface engaging said shift lever.

* * * * *